(12) United States Patent
Wang

(10) Patent No.: US 11,946,508 B2
(45) Date of Patent: Apr. 2, 2024

(54) CAGE ASSEMBLY, PLANAR THRUST BEARING, RADIAL BEARING AND CONICAL RADIAL-THRUST BEARING

(71) Applicant: Hong Jiang, Beijing (CN)

(72) Inventor: Xiaochun Wang, Beijing (CN)

(73) Assignee: Hong Jiang, Beijing (CN)

( * ) Notice: Subject to any disclaimer, the term of this patent is extended or adjusted under 35 U.S.C. 154(b) by 0 days.

(21) Appl. No.: 18/218,641

(22) Filed: Jul. 6, 2023

(65) Prior Publication Data
US 2023/0349423 A1     Nov. 2, 2023

Related U.S. Application Data

(63) Continuation of application No. PCT/CN2022/112809, filed on Aug. 16, 2022.

(30) Foreign Application Priority Data

Mar. 7, 2022    (CN) .......................... 202210215807.1

(51) Int. Cl.
*F16C 33/48*      (2006.01)
*F16C 19/28*      (2006.01)
(Continued)

(52) U.S. Cl.
CPC .............. *F16C 33/48* (2013.01); *F16C 19/28* (2013.01); *F16C 19/305* (2013.01); *F16C 19/38* (2013.01); *F16C 33/4623* (2013.01)

(58) Field of Classification Search
CPC ........ F16C 19/28; F16C 19/305; F16C 19/38; F16C 33/4623; F16C 33/4629; F16C 33/4635; F16C 33/48
See application file for complete search history.

(56) References Cited

U.S. PATENT DOCUMENTS

| 1,300,386 | A | * | 4/1919 | Hart | ........................ F16C 33/48 |
| | | | | | 384/623 |
| 1,327,003 | A | * | 1/1920 | Luloff | ................... F16C 19/364 |
| | | | | | 384/580 |
| 1,330,158 | A | * | 2/1920 | Arnold | ................... F16C 43/083 |
| | | | | | 29/520 |

(Continued)

FOREIGN PATENT DOCUMENTS

| CN | 201318392 Y | 9/2009 |
| CN | 113124059 A | 7/2021 |

(Continued)

OTHER PUBLICATIONS

Notice of Allowance of counterpart Chinese Patent Application No. 202210215807.1 dated Dec. 5, 2022.

(Continued)

*Primary Examiner* — Alan B Waits

(57) ABSTRACT

A bearing cage assembly comprises multi-group rollers (2), each group has multiple rollers, and each roller is a barrel roller, multiple rollers are stacked together to form a group of rollers, and the end surfaces of each two adjacent rollers contact with each other. Multiple groups of pockets (11) are formed in the cage, and each group of pockets has multiple pockets. The pockets in any group are distributed along the circumference direction of the said cage, and a group of rollers is disposed in each pocket. Multi-group rollers can roll in circumferential direction of the cage. During the rolling process, a great number of contact points are distributed on the raceways, thus the load capacity of the bearing is improved, the friction resistance is low, suitable for the fields where high speed operation is necessary. A planar thrust bearing, a radial bearing and a conical radial-thrust bearing are provided.

11 Claims, 18 Drawing Sheets

(51) Int. Cl.
*F16C 19/30* (2006.01)
*F16C 19/38* (2006.01)
*F16C 33/46* (2006.01)

(56) References Cited

U.S. PATENT DOCUMENTS

| | | | |
|---|---|---|---|
| 4,620,456 A | 11/1986 | Distin et al. | |
| 9,790,993 B1* | 10/2017 | Makke | F16C 19/305 |
| 9,810,261 B1* | 11/2017 | Gavriliuc | F16C 19/305 |
| 11,162,534 B1* | 11/2021 | Brown | F16C 33/56 |
| 2003/0063829 A1 | 4/2003 | Tamada et al. | |
| 2005/0043137 A1* | 2/2005 | Shinoda | F16C 19/30 476/40 |
| 2006/0088237 A1* | 4/2006 | Yamamoto | F16C 33/4676 384/623 |
| 2016/0010688 A1* | 1/2016 | Tate | F16C 33/40 384/608 |

FOREIGN PATENT DOCUMENTS

| | | |
|---|---|---|
| CN | 114076147 A | 2/2022 |
| CN | 114427573 A | 5/2022 |
| DE | 102014218301 A1 | 3/2016 |
| EP | 2012030 A1 | 1/2009 |
| EP | 3078869 A1 | 10/2016 |
| JP | S5830526 A | 2/1983 |
| JP | 2007239929 A | 9/2007 |
| JP | 2008002673 A | 1/2008 |
| TW | 200607938 A | 3/2006 |

OTHER PUBLICATIONS

First Office Action of counterpart Chinese Patent Application No. 202210215807.1 dated Oct. 10, 2022.
Written Decision on Registration of counterpart Korean Patent Application No. 10-2023-7019953 dated Oct. 26, 2023.

* cited by examiner

CAGE ASSEMBLY, PLANAR THRUST BEARING, RADIAL BEARING AND CONICAL RADIAL-THRUST BEARING

CROSS-REFERENCES TO RELATED APPLICATIONS

This application is a Continuation Application of PCT Application No. PCT/CN2022/112809 filed on Aug. 16, 2022, which claims priority to Chinese Patent Application No. 202210215807.1, entitled by "cage assembly, planar thrust bearing, radial bearing and conical radial-thrust bearing", filed on Mar. 7, 2022 before China National Intellectual Property Administration (CNIPA), which is incorporated herein by reference in its entirety.

FIELD OF INVENTION

The present application relates to bearing, especially relates to a kind of cage assembly, planar thrust bearing, radial bearing and conical radial-thrust bearing.

BACKGROUND

Rolling bearings are widely used in different kind of machinery. Although there are various rolling bearings, few thrust bearings are characterized by compact size, uniform force distribution, being not prone to eccentric load, higher speed limit and low friction resistance. First take thrust bearing as an example: ball thrust bearings with raceways generally have a larger axial size, and the load capacity is not good enough; cylindrical roller thrust bearings do not work in a pure rolling situation, experience a large friction resistance, generate more heat, cannot be used in the situation where high speed operation is necessary; planar needle bearings not only have a high friction resistance, but also are prone to wandering, have a rather low speed limit, not suitable for many fields. The friction resistance of planar high-density ball thrust bearing is very low, suitable for the fields where high speed operation is necessary; however, its unit area load capacity is relatively lower, the main reason is that the relative curvature between the ball and planar raceway is large, in comparison with the space the ball occupied, the proportion of the contact area between the ball and the raceway is very small. Therefore, existing bearing structures can hardly satisfy the requirement of high load capacity, low mass, low friction resistance and higher speed limit. Similar situation also appears in radial bearing and radial-thrust bearing.

SUMMARY

In view of this, a kind of cage assembly, planar thrust bearing, radial bearing and conical radial-thrust bearing is provided, to solve the existing problem that existing bearings can not satisfy the requirement of high load capacity, low mass, low friction resistance and higher speed limitation at the same time.

To achieve the purpose mentioned above, a technical solution is provided.

The first aspect of this application is a kind of cage, comprising: an annular cage, in which multi-group pockets are circumferentially distributed, wherein the circumferential distribution tracks for said multi-group pockets are located in different radial positions of the cage, respectively.

Multi-group rollers are included, each group of which comprises multiple stacked rollers, wherein each of said rollers is a barrel roller.

In each pocket, a group of said rollers is provided, and said rollers in said multi-group pockets are rollable in the cage in circumferential direction thereof.

A further option is that, the ratio of the thickness of each said roller to maximum diameter thereof is no more than one-third.

Another option is that, wherein the ratio of the thickness of each roller to maximum diameter thereof is no less than ⅛.

A further option is that, the curvature radius of the generatrix of the rollers is no more than 10 times of maximum radius thereof.

Another option is that, in each group of rollers, the number of rollers is more than 1, and no more than 10.

A further option is that, the said pockets are rectangular.

Another option is that, the length of said pocket extending along the axis of the rollers is W1, while the length of said pocket is W2, the maximum diameter of said rollers is provided to be Dmax, and the stacked gapless height of one group of said rollers in the pocket is H, the fit clearance between said rollers and said pocket is $\zeta$, where W1=H+n×$\zeta$, W2=Dmax+$\zeta$, 0.005 mm≤$\zeta$≤0.015 mm, where n denotes the number of rollers in the pocket.

Another option is that, the material for said cage is selected from metal, polymer; the tensile strength of said polymer cage is not less than 840 MPa; the tensile strength of said metal cage is not less than 840 MPa.

A further option is that, the cage is made of fibereinforced composite.

Another option is that, the said cage is formed by filaments winding from filaments made of fibereinforced composite, and the filaments wind interlaced in circumferential direction of said cage.

The second aspect of this application provides a kind of planar thrust bearing, comprising a kind of cage assembly provided in the first aspect of this application.

A further option is that, said planar thrust bearing also comprises a first and second strut member; said cage is annular plate-shaped, said first strut member is arranged on one axial side of said cage and has a first planar raceway, which encircles the axis of the cage and with which multi-group rollers are in rolling contact; the second strut member is arranged on the other axial side of said cage and has a second planar raceway, which encircles the axis of the cage and with which multi-group rollers are in rolling contact; multi-group rollers are rollable on both first and second raceways in circumferential direction of the cage.

Another option is that, on the transverse plane of the cage, perpendicular to the axis of the cage, the centers of the pockets in each pocket group are distributed in circumferential direction of said cage along an elliptic track; the center of the elliptic track for each pocket group is concentric with the center of the cage, and the major axes of any two elliptic tracks, in each of which the pocket centers are distributed, are collinear with each other.

The third aspect of this application provides a kind of radial bearing, comprising a kind of cage assembly provided in the first aspect of this application.

A further option is that, said radial bearing also comprises a bearing cone and cup; said cage is tube-shaped, a first cylindrical raceway is formed on the bearing cone such that it surrounds said cage from inside; said bearing cone is nested within said bearing cup, and said cage is disposed within the annular space between the bearing cone and bearing cup; a second cylindrical raceway is formed on the cup such that is encircles around said cage; multi-group rollers are in rolling contact with the first and second raceways and rollable on both the first and second cylindrical raceways in circumferential direction of the cage.

Another option is that, the centers of the pockets in each group are distributed along circumferential direction of said cage in a sine curve trajectory.

The fourth aspect of this application provides a kind of conical radial-thrust bearing, comprising a kind of cage assembly provided in the first aspect of this application.

A further option is that, said conical radial-thrust bearing also comprises first and second strut members, said first strut member is a cup facing towards the outer circular cone of said cage and having a first conical raceway encircling said cage, and multi-group rollers are in rolling contact with said first conical raceway; said first conical raceway is oriented to face towards the outer circular cone of said cage; said second strut member has a second conical raceway surrounding the said cage from inside and facing towards the inner circular cone of said cage, and multi-group rollers are in rolling contact with said second conical raceway; multi-group rollers are rollable on both the first and second conical raceways in circumferential direction of the cage.

Beneficial effect: multiple stacked rollers are provided in each pocket in this disclosure, and each said roller is a barrel roller. When the rollers are in rolling contact with the raceways, a great number of contact points are distributed on the raceway. Thus it is possible to adopt thinner race rings, or it is even possible to adopt case-hardening treatment to process the surface of the shaft or workpiece into the raceway, realizing the purpose of compact and lightweight design in bearing. Meanwhile, it also filled up the wide gap among the high-density ball bearing characterized by high efficiency and high limit speed, but comparatively lower load capacity; needle bearing characterized by lower limit speed, smaller volume, lightweight and higher load capacity; and cylindrical roller bearing characterized by being thicker and heavier, but having a higher load capacity.

DESCRIPTION OF DRAWINGS

The above and other objects, features and advantages of the present disclosure will become more apparent by a detailed description of exemplary embodiments thereof with reference to the accompanying drawings. The accompanying drawings described below are only a part of embodiments of the present disclosure, and other drawings may be obvious to an ordinary skilled person in the art based on these drawings.

REFERENCE NUMERALS

Figure 1:
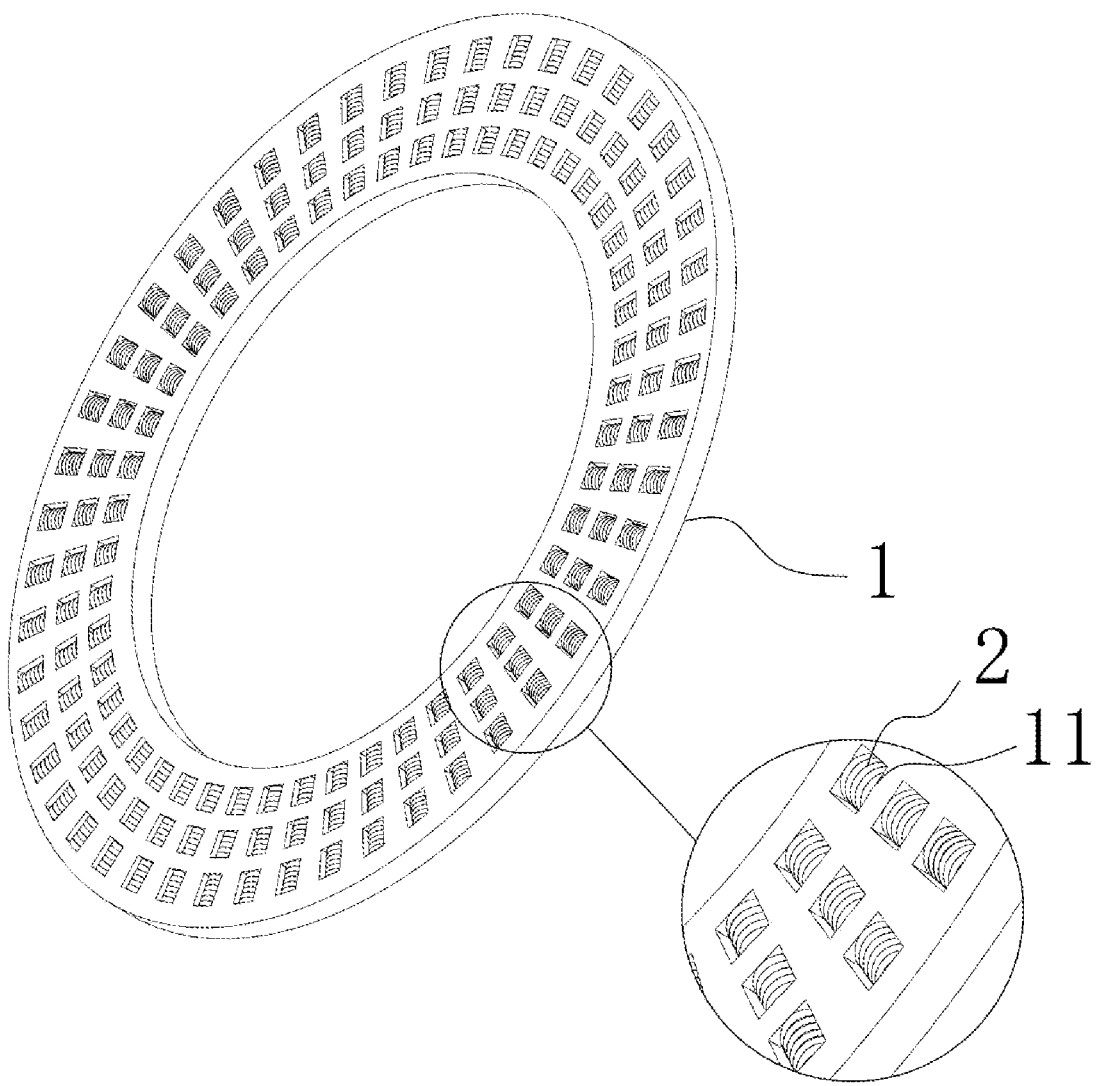
FIG. 1 exemplarily shows the schematic diagram of the first structure of the rollers provided in the pocket of the cage in embodiment 1 of present disclosure.

1—cage; 11—pocket; 2—roller; 31—first strut member; 32—second strut member; 41—cone (inner ring); 42—cup (outer ring); 43—sine curve.

DETAILED DESCRIPTION OF INVENTION

In order to make the purpose, technical solutions and advantages of the embodiments of the present disclosure clearer, the technical solutions in the embodiments of the present disclosure will be described clearly and completely below in conjunction with the accompanying drawings of the embodiments of the present disclosure, and it is obvious that the described embodiments are a part of the embodiments of the present disclosure, rather than all of them. Based on the embodiments in the present disclosure, all other embodiments which may be obvious to an ordinary skilled person in the art will fall within the scope of protection of the present disclosure.

The terms as used herein are solely for the purpose of describing particular embodiments and are not intended to limit the present disclosure. The singular forms of "a", "said" and "the" as used in the specification and the appended claims are also intended to include plural forms, unless the context clearly indicates otherwise. Unless the context clearly indicates otherwise, "a plurality" generally includes at least two, but does not exclude at least one.

It should be understood that the term "and/or" as used herein is simply a description of the relationship of the associated items, indicating that three relationships can be comprises, for example, A and/or B can mean: A alone, both A and B, and B alone. In addition, the character "/" herein generally indicates that the item therebefore and the item thereafter are in an "or" relationship.

It should also be noted that the term "include," "comprise," or any other variation thereof is intended to cover non-exclusive inclusion, such that a product or system that includes a set of elements includes not only those elements, but also other elements not explicitly indicated, or also other elements that are inherently included in the product or system. Unless stated otherwise, an element qualified by the statement "comprise a . . . " does not preclude the existence of additional identical elements in the product or system including said element.

To make a further exposition of the technical proposal in this disclosure, embodiments as follows are presented with reference to FIG. 1 to FIG. 11.

Embodiment 1

A kind of cage 1 assembly is provided in present embodiment, as illustrated in FIG. 1 to FIG. 7, which assembly comprises cage 1 and multi-group rollers 2. The number of the rollers 2 in each group is multiple, and each roller 2 is a barrel roller. Multiple rollers are stacked together to form a group, and the end faces of each two adjacent rollers abut on each other. Multi-group pockets 11 are provided in the cage 1, and the number of pockets 11 in each group is multiple. For any group, the pockets 11 are distributed in the circumferential direction of the cage 1, and each of pockets 11 is provided with a group of rollers 2. Multi-group rollers 2 can roll circumferentially in the cage 1.

The barrel rollers in the embodiment refer to the roller formed of rotary convex circular arc surface or rotary convex elliptic arc surface, and both end faces are planes.

The ratio between the major and minor axes of the contact ellipse between the barrel roller and raceway (if the outer surface of the barrel roller is a sphere, the ratio between the major and minor axes can be considered to be 1) cannot be too large, otherwise its function will be similar to a cylindrical roller, especially for thrust bearing and conical radial-thrust bearing with large pressure angle, the slip speed at inner and outer ends of the contact ellipse will increase, leading to larger friction resistance. The thickness of the barrel roller cannot be too small, its thickness should be not less the 1.2 times of the major axis of the contact ellipse or of the diameter of the contact circle under maximum load. The stability of compressed bar should also be taken into account, such that not only elastic instability must be avoided, but also the bending deformation should be strictly controlled to a level of less than one-third of the average clearance between the rollers 2 (it can be understood that, suppose the clearance between rollers and between the roller and the side wall of pocket 11 is $\zeta$, the bending deformation should be less than $\zeta/3$), to avoid Murphy's law play a role to cause adjacent rollers to bend towards different direction, leading to the rollers 2 stuck into the pocket 11. In addition, during the running process of the bearing, caused by the function of friction, the rollers are prone to spin, and the spinning torque is balanced by the constraining force exerted on the end face of the rollers by the side wall of the pocket 11. Since the direction of the spinning torque of stacked rollers is just the same, which will overlay together, the number of barrel rollers 2 provided in each pocket 11 should be restricted, otherwise the friction resistance will increase, and will quicken the abrasion in side wall of the pocket in cage 1. Thus the number of the stacked rollers 2 in each pocket is preferably 8 or less, and at most is 10. Therefore, the number of the rollers 2 in a group is more than 1, and less or equal to 10.

Multiple rollers 2 are set in a pocket, and each roller 2 is a barrel roller. When these rollers are in rolling contact with the raceway, the contact area for each contact point is increased, meanwhile the number of contact points in unit area is also increased. In comparison, if a ball is used as the roller 2, limited by the allowable contact stress of the bearing material, the diameter of the contact point is usually only about 5.5% of the diameter of the ball, which means if ball is used as the roller 2, 90% pocket area is wasted.

The efficiency, speed limit and volume of the bearing presented in this disclosure, that is, based on stacked barrel rollers, are similar to high-density ball bearing, however, its load capacity is similar to cylindrical roller bearing or conical roller bearing, being suitable for high-speed, heavy-duty application field, being a partial replacement of hydrostatic and hybrid bearings, but the manufacture, assembly and maintenance cost of the former is much less than the later. Once some standard barrel rollers become available, the design and manufacture of this kind of bearing will become rather easy due to its structure. As a result, machinery manufacturers with relatively strong ability can develop off-standard bearings by themself, which greatly improves their product design flexibility, shortens production cycle.

Based upon the improvement mentioned above, an option is that, the thickness s of each roller 2 is less than or equal to one-third of its maximum diameter Dmax, so as to increase the number of contact points on the raceway within the pocket 11.

Based upon the improvement mentioned above, an option is that, the curvature radius of the generatrix of the rollers 2 is less than or equal to 10 times of its maximum radius, so as to diminish the friction resistance of the bearing.

Based upon the improvement mentioned above, an option is that, the pockets 11 are rectangular.

The line from the crossing point of the diagonals of the pockets 11 to the center of rotation of the cage 1 is parallel to two opposite sides of the pocket 11, and perpendicular to two other opposite sides thereof.

Based upon the improvement mentioned above, an option is that, the length of the side of the pocket 11 extending along the axis of the rollers is W1, while the length of the other side of the pocket 11 is W2. The maximum diameter of the said rollers 2 is supposed to be Dmax, and the stacked gapless height of one group of the rollers 2 in the pocket is H, the fit clearance between the rollers 2 and the pocket 11 is $\zeta$, where W1=H+n×$\zeta$, W2=Dmax+, 0.005 mm≤$\zeta$≤0.015 mm, where n denotes the number of rollers in a group, which means some oil film thickness is left between the rollers, to ensure the rollers 2 can freely roll within the pockets 11. For planar thrust bearing and conical radial-thrust bearing, within the same pocket, the pure rolling speed for each roller is different, so the clearance for oil film can ensure the problem of obvious sliding friction and freeze is avoided.

Based upon the improvement mentioned above, an option is that, the cage 1 is a metal cage 1 or a polymer cage 1, and the tensile strength of the polymer cage or metal cage is not less than 840 MPa. For the application field where the weight is not critical, wear-resistant metal material such as bronze and brass can be used for cages 1, their processing property is good, cost is reasonable, for single unit or small batch, initial investment is low. However, if the bearing not only spins about its own axis, but also has to perform complex spatial motion, such as the case of the planar thrust bearing for nutation reducers, lightweight materials such as filaments winding fibereinforced composite can be used. The cage 1 is formed by filaments winding from filaments made of fibereinforced composite, and filaments wind interlaced in circumferential direction of the cage 1. In this way, the tensile strength is good, the service life can be improved. The cage 1 can also be made of high-strength single component polymer, particularly the tensile strength should be not less than 840 MPa.

Cage 1 can be made of fibereinforced composite, had better by means of filaments winding method, and filaments wind interlaced in circumferential direction of the cage 1, so as to improve the tensile strength of the overall cage 1, increase the service life of the cage 1.

Embodiment 2

A kind of planar thrust bearing is provided in present embodiment, as illustrated in FIG. 1 to FIG. 5 and FIG. 12*a* to FIG. 12*b*, which bearing comprises the cage 1 assembly according to the example of embodiment 1, particularly also comprising the first strut member 31 and second strut member 32. The cage 1 is annular plate-shaped. The first strut member 31 is provided on one axial side of the cage 1 and comprises the first planar raceway, which encircles the axis of the cage 1, and multi-group rollers 2 are in rolling contact with the first circular planar raceway.

The second strut member 32 is provided on the other axial side of the cage 1 and comprises the second planar raceway, which encircles the axis of the cage, and multi-group rollers are in rolling contact with the second circular planar raceway. Multi-group rollers can roll on both first and second raceways in circumferential direction of the cage 1.

In this embodiment, the cage 1, the first and second strut members 31 and 32 can be annular plate-shaped, but they are not limited to this shape. Rather, it is possible for them to be made into other shapes according to specific need. The first and second strut members 31 and 32 can be provided on opposite axial sides of the cage 1, respectively. Multi-group rollers 2 protrude out the two end planes of the cage 1, in rolling contact with the first and second raceways. What needs to be specially explained is that the axis of the cage 1 in this embodiment is the centerline of the cage 1, about which the cage 1 rotates.

Based upon the improvement mentioned above, an option is that, on an end plane of the cage 1 perpendicular to the axis of the cage, the centers of the pockets 11 in each group are distributed along an elliptic track, circumferentially around the center of the cage 1. The center of the elliptic track is concentric with the center of the cage 1, and the major axes of the elliptic tracks for any two groups of pockets 11 are collinear with each other. In this way, few rollers 2 share the same track radius when they roll on the raceway, therefore, the service life of the bearing is prolonged. The number of the pockets in a group can be an even number in this embodiment to get a better dynamic balance.

Figure 2:
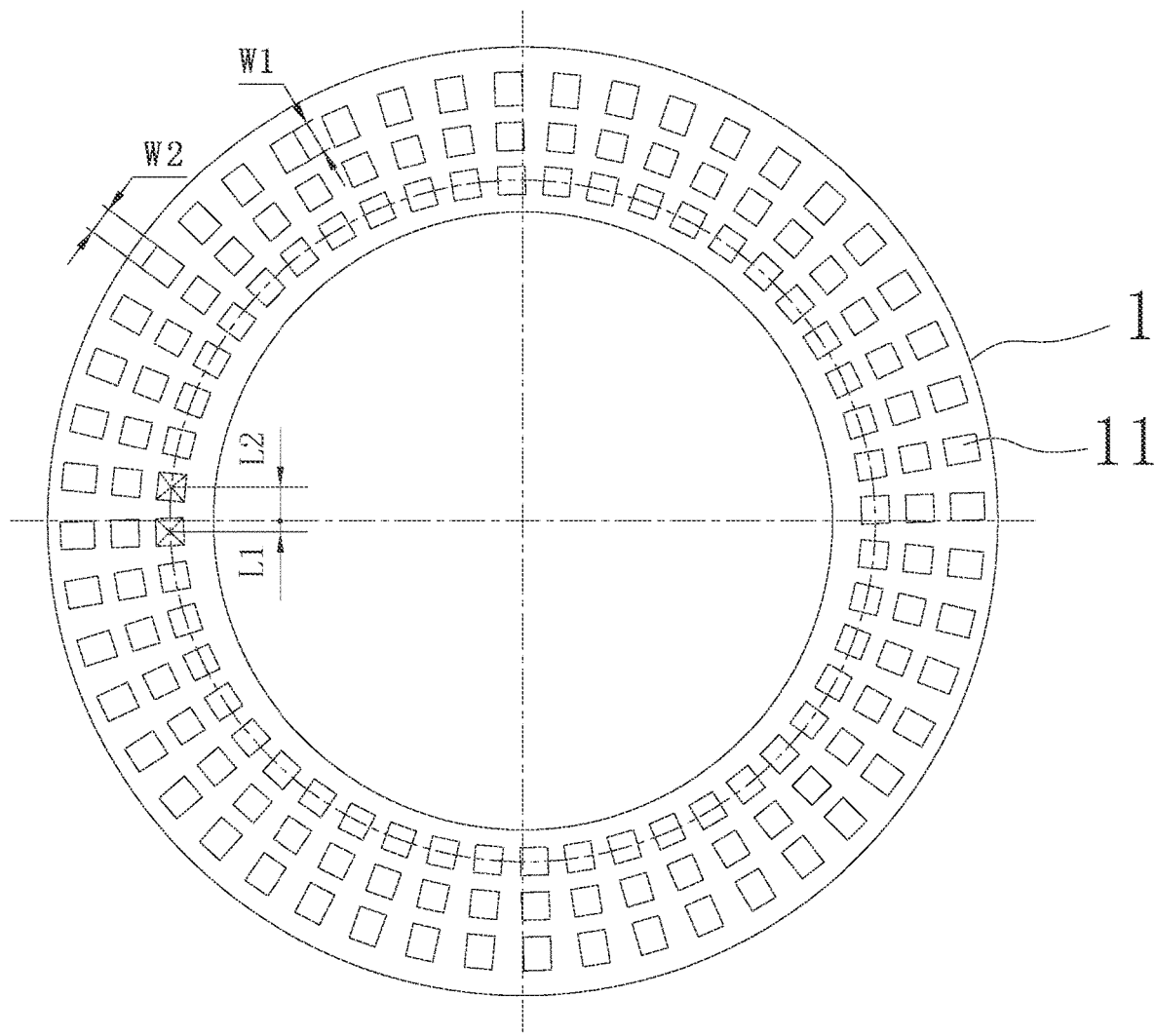
FIG. 2 exemplarily shows the main view of the cage in FIG. 1.
Figure 3:
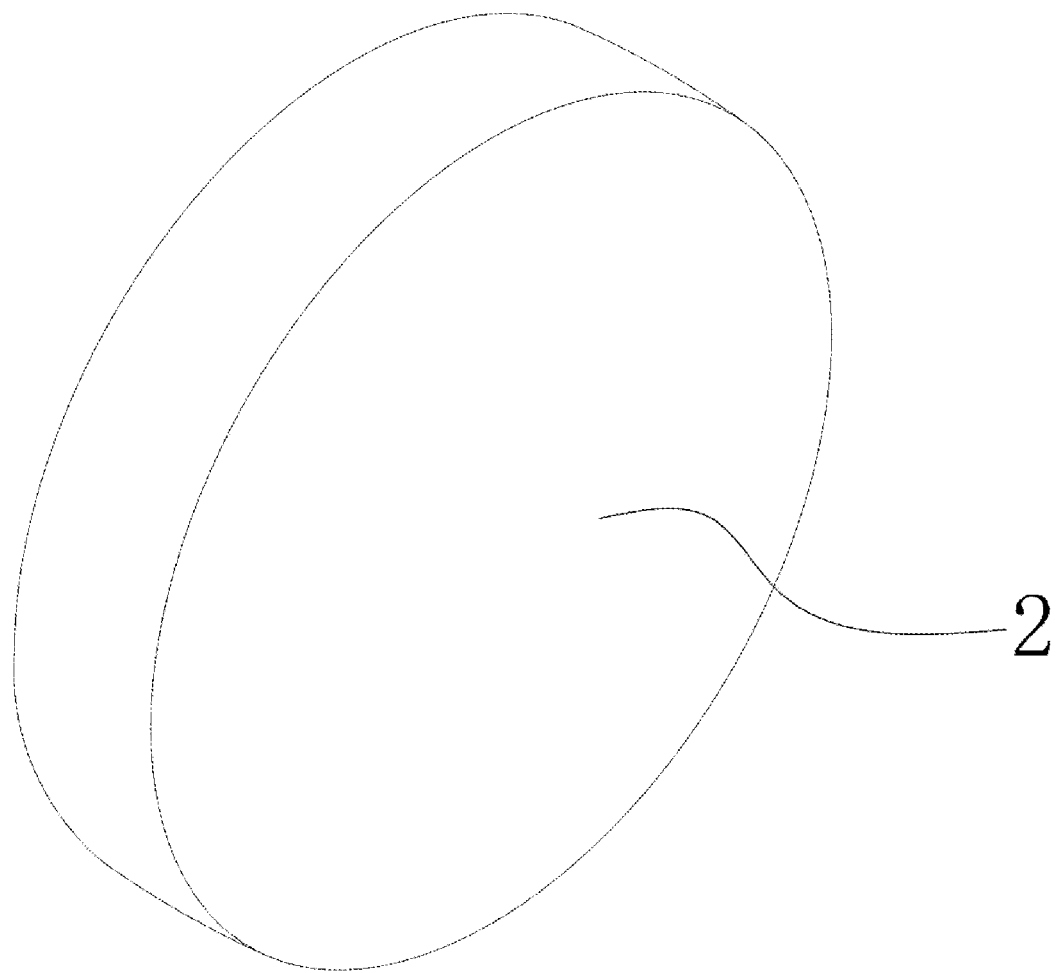
FIG. 3 exemplarily shows the perspective view of the roller in roller bearing according to embodiment 1-4 of present disclosure.
Figure 4:
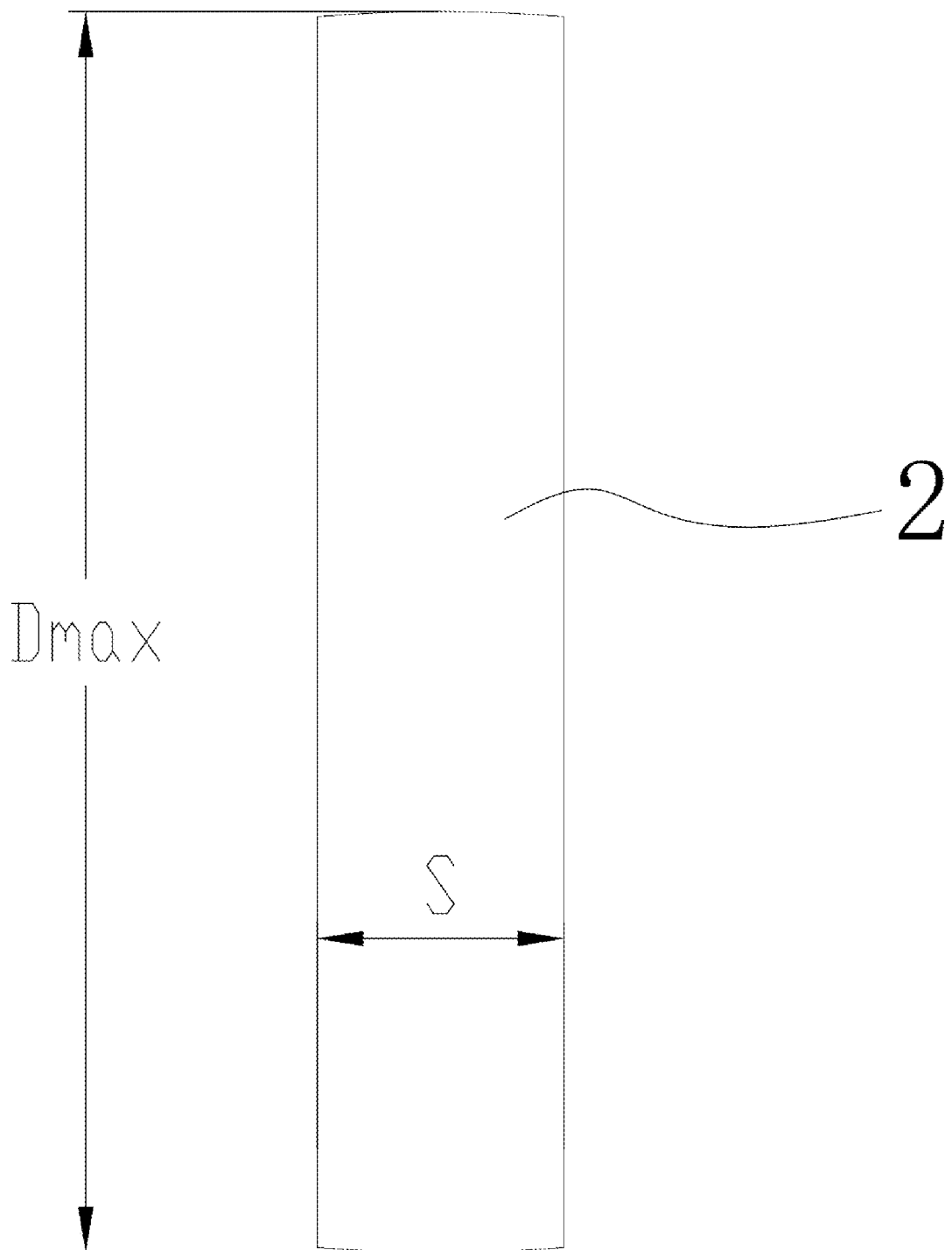
FIG. 4 exemplarily shows the main view of the roller in roller bearing according to embodiment 1-4 of present disclosure.
Figure 5:
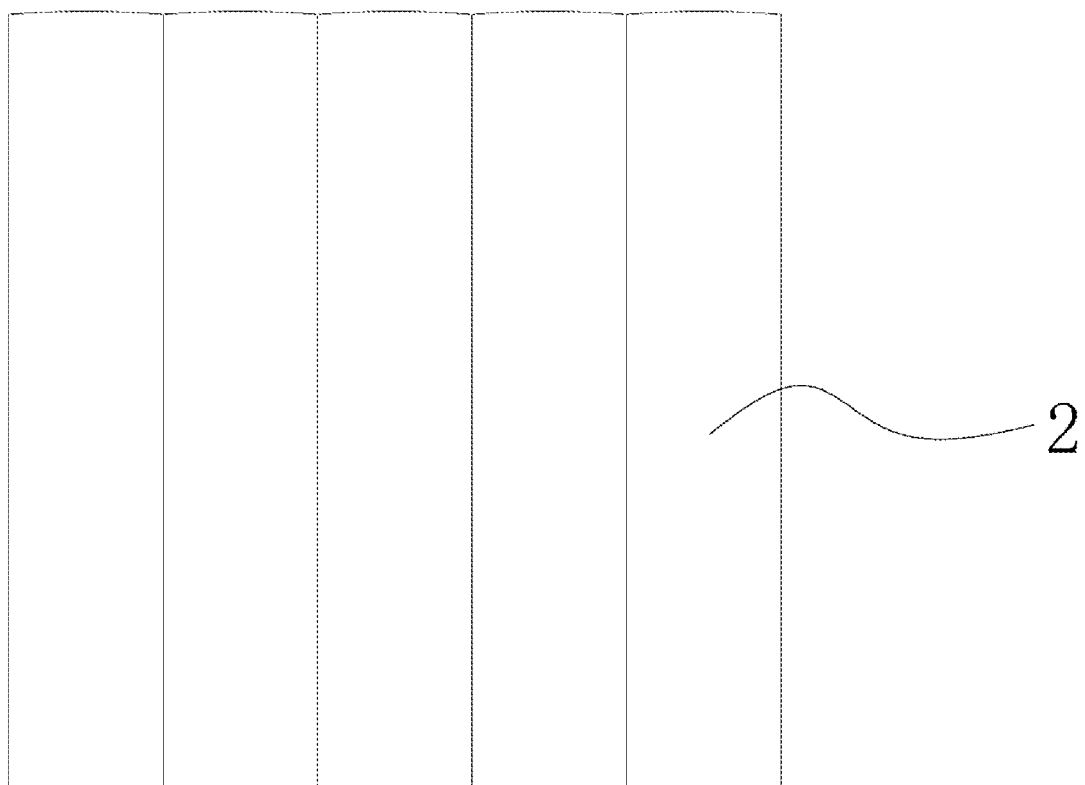
FIG. 5 exemplarily shows the schematic diagram of a group of stacked rollers in roller bearing according to embodiment 1-4 of present disclosure.
Figure 6:
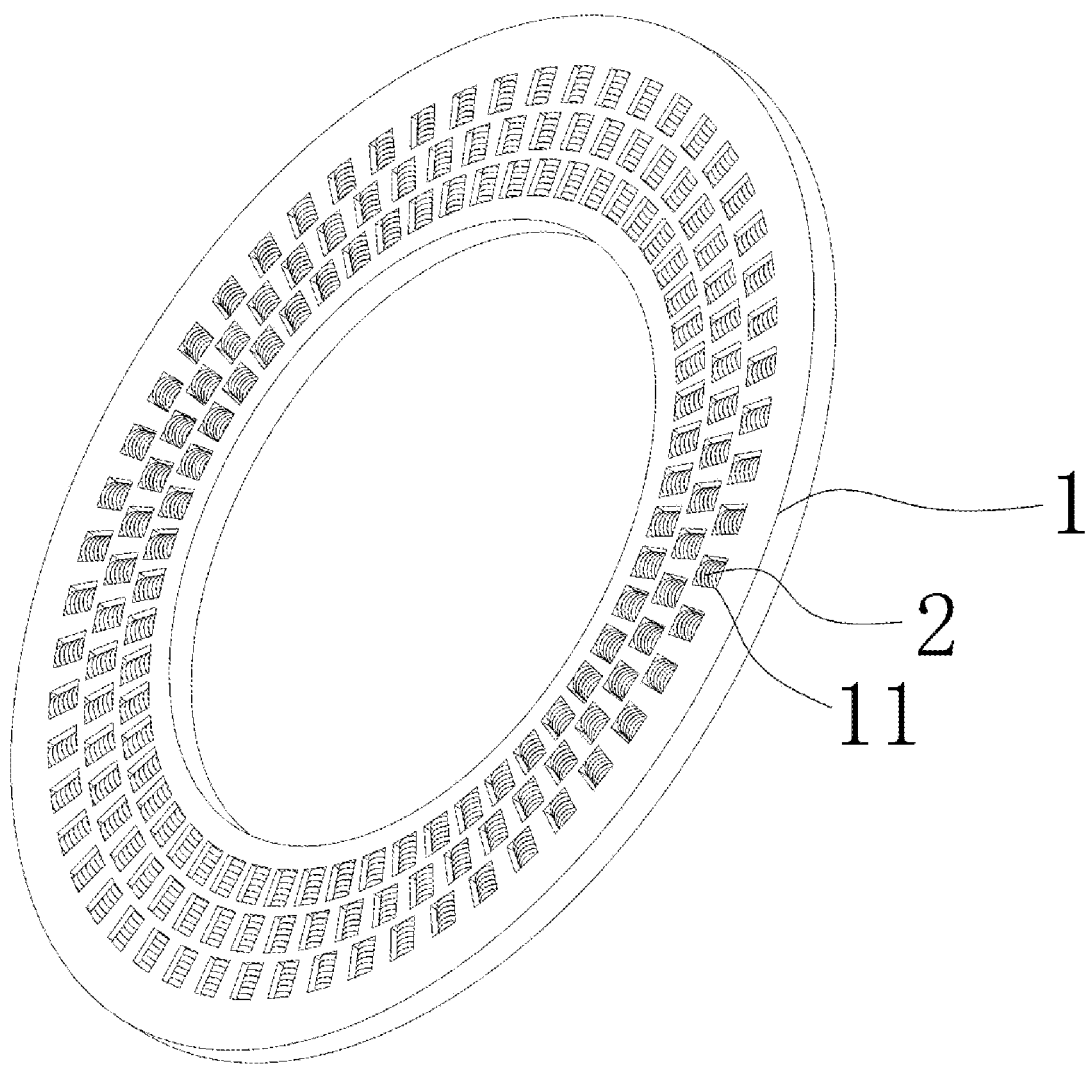
FIG. 6 exemplarily shows the schematic diagram of the second structure of the rollers provided in the pocket of the cage in embodiment 1 of present disclosure.
Figure 7:
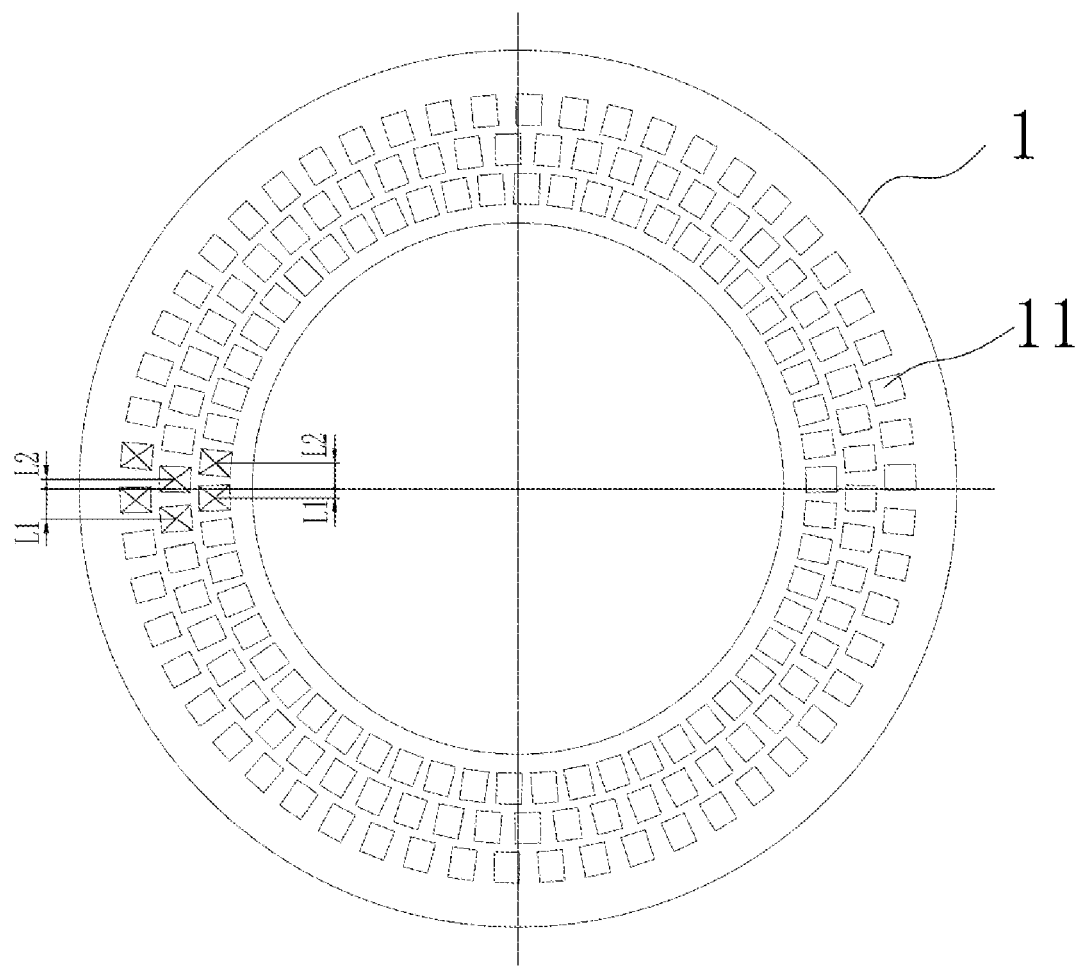
FIG. 7 exemplarily shows the main view of the cage in FIG. 6.

A preferred option is that, as illustrated in FIG. 1 and FIG. 2, if multiple pockets are arranged to be aligned with each other along the radial direction of the cage 1 (i.e., linear alignment), the cage 1 has a better rigidity. In this case, for a pair of two adjacent pockets nearest to the major axis of the ellipse in a group of the pockets, the ratio of the distance, which is measured from the center of one of these two pockets 11 to major axis, to the distance, which is measured from the center of the other pocket 11 to major axis, is constant among the groups, wherein the value of the ratio is P=L1:L2, and the value of P can be 1:3 or 3:1. As illustrated in FIG. 6 and FIG. 7, if any two adjacent pockets are arranged in staggered form, the rigidity of the cage 1 will be not so good as in linear alignment. In the case of staggered form, multiple groups of pockets 11 from inner to outer in turn are expressed as A1, A2 ... An, and for a pair of two adjacent pockets nearest to the major axis of the ellipse in the odd groups, the ratio of the distance, which is measured from the center of one of these two pockets 11 to major axis, to the distance, which is measured from the center of the other pocket to major axis is P, P=L1:L2, while for a pair of two adjacent pockets nearest to the major axis of the ellipse in even groups, the ratio is 1/P, where P can be 1:3 or 3:1.

For this arrangement, the raceway has a less elastic deformation, being suitable for the situation where the wall thickness of raceway is thinner. In practice, the arrangement being adopted should be based on specific occasion. Above arrangements are the best choice of present embodiment, but it is not limited to above mentioned. Rather, it is possible to make a reasonable arrangement in accordance with specific requirement.

Embodiment 3

A kind of radial bearing is provided in present embodiment, as illustrated in FIG. 8, FIG. 9 and FIG. 13*a* to FIG. 13*b*, which bearing comprises the cage 1 assembly according to the example of embodiment 1, particularly also comprises a cone 41 and a cup 42. The cage 1 is a tube-shape part, a first cylindrical raceway surrounding the said cage 1 from inside is formed on the cone 41. The cone 41 is nested within the cup 42, the cage 1 is provided within the annular space between the cone 41 and the cup 42. A second cylindrical raceway encircling the cage 1 from outside is formed on the cup 42. Multi-group rollers 2 are in rolling contact with the first and second raceways, can roll on both the first and second cylindrical raceways in circumferential direction of the cage 1.

A further option is that, in each group of the pockets 11, the center points of the pockets 11 are circumferentially distributed in a sine curve track 43 to reduce the wear and pitting. An option is that a group of the pockets is arranged such that the center points of these pockets in a round of the cage 1 are distributed in a two-cycle sine curve track 43. For the bearing involved in nutational movement, the number of pockets included in a group is an even number, the pockets 11 are arranged such that the center points of the pockets in a round of the cage 1 are distributed in a two-cycle sine curve track 43.

The sine curve 43 in this embodiment is an imaginary curve running circumferentially in the cage 1, which is stated herein just for the illustration of the arrangement of the pockets 11. Each group of pockets has a corresponding imaginary sine curve 43.

Figure 8:
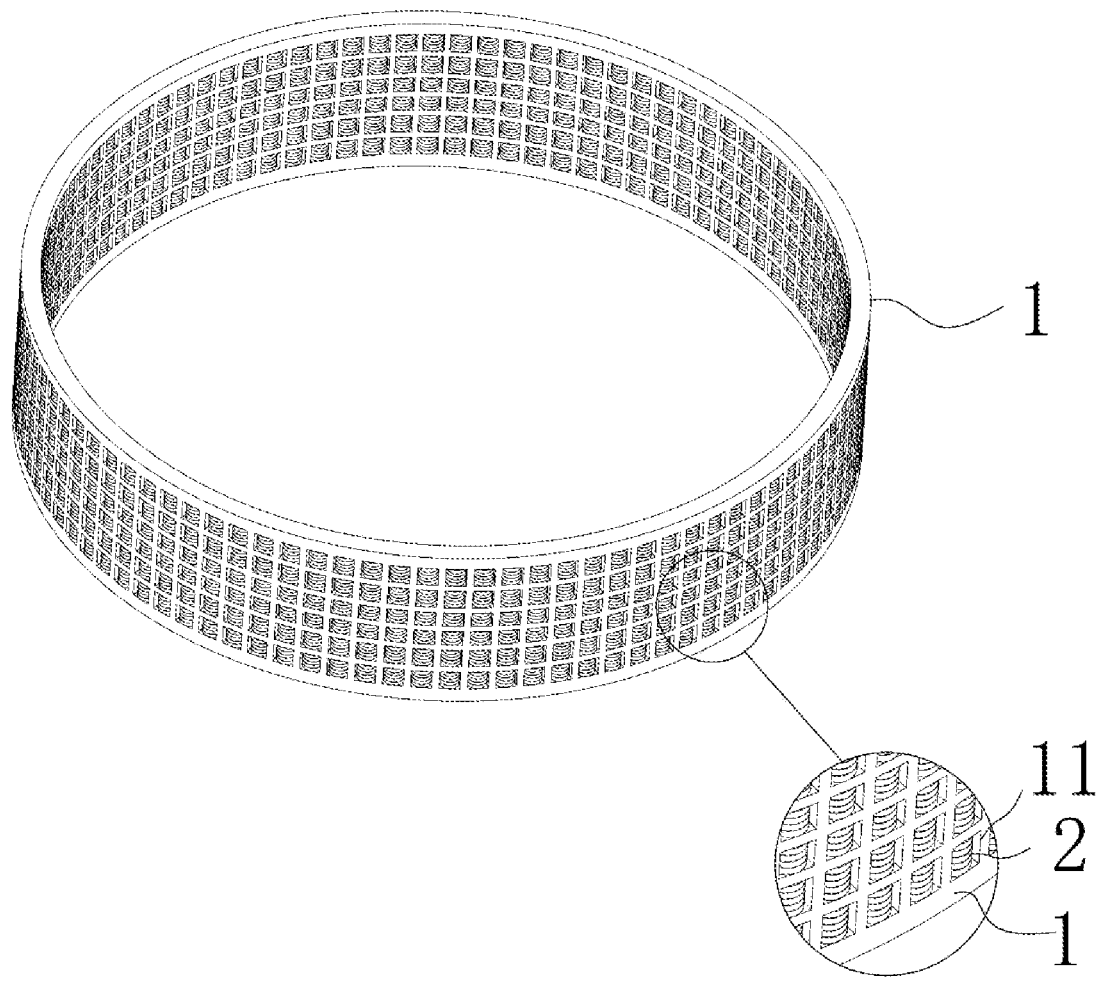
FIG. 8 exemplarily shows the schematic diagram of the first structure of the rollers provided in the pocket of the cage in embodiment 2 of present disclosure.
Figure 9:
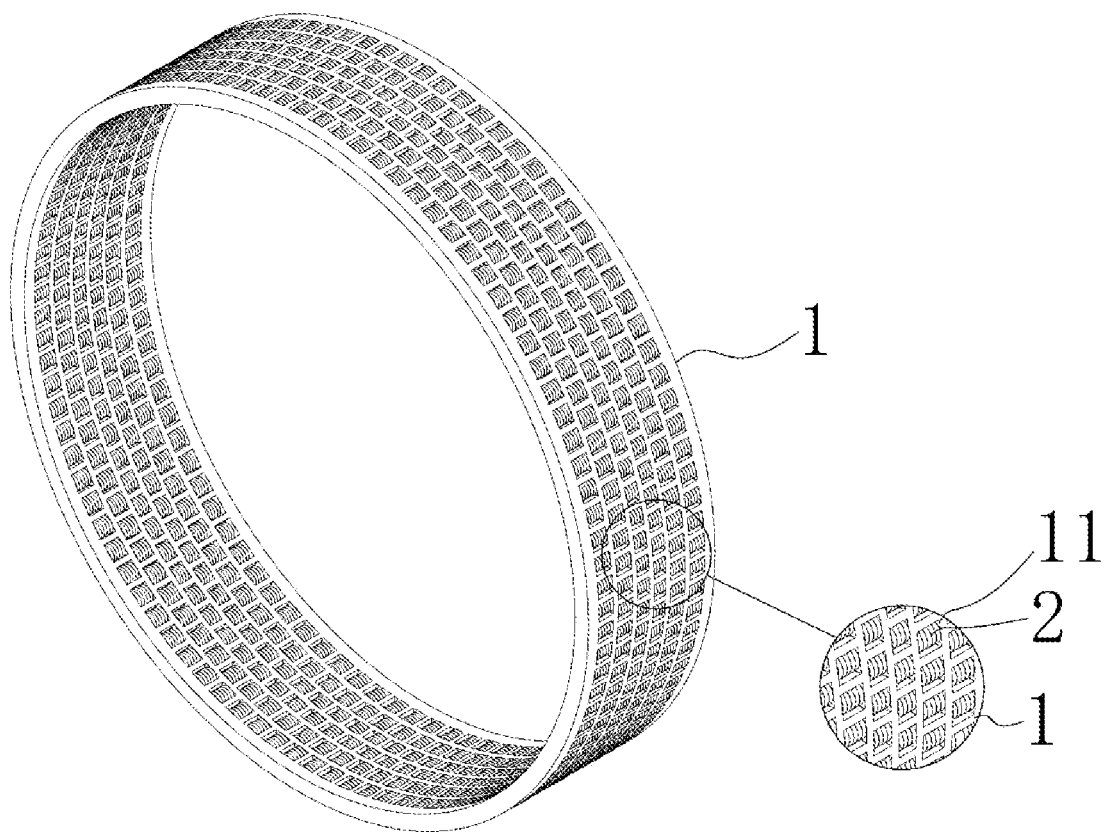
FIG. 9 exemplarily shows the schematic diagram of the second structure of the rollers provided in the pocket of the cage in embodiment 2 of present disclosure.

An option is that, as illustrated in FIG. 8, if pockets in multiple groups are arranged to be aligned with each other along the axis of the cage 1 (i.e., linear alignment), for a pair of adjacent pockets in the same group, nearest to the wave crest of sine curve 43, the ratio between the distances of their center points to wave crest is constant among groups and can be set to be 1:3 or 3:1. The material of cage 1 along both the diameter and weft lines is continuous, having a better rigidity, but the defect is that the contact points are also distributed in diameter line on the raceway. As a result, if the race track is not thick enough, its deformation will be larger. As illustrated in FIG. 9, the pockets in adjacent groups are arranged in staggered form, multiple groups of pockets 11 from one end to the other end along the axis of cage 1 in turn are expressed as B1, B2 ... Bn. For the odd groups, the ratio between the distances from the centers of a pair of adjacent pockets 11, that are nearest to the wave crest of sine curve 43, to wave crest is K, while for even groups, the ratio between the distances from the centers of a pair of adjacent pockets 11, that are nearest to the wave crest of sine curve 43, to wave crest is 1/K, where K can be 1:3 or 3:1. For this arrangement, since the cage 1 material along diameter line is zigzag, the rigidity of the cage 1 is a little weaker, but the pockets 11 are in diamond pattern on the raceway, resulting in less elastic deformation of the raceway and thus suitability for the situation where the wall thickness of raceway is thinner. Above arrangements are the best choice of present embodiment, but it is not limited to above mentioned. Rather, it is possible to make a reasonable arrangement in accordance with specific requirement.

Embodiment 4

A kind of conical radial-thrust bearing is provided in present embodiment, as illustrated in FIG. 10, FIG. 11 and FIG. 14a to FIG. 14b, which bearing comprises the cage 1 assembly according to the example of embodiment 1, particularly also comprises the first and second strut members 31 and 32. The first strut member 31 is a cup 42, facing towards the outer circular cone 41 of the cage 1. A first conical raceway is formed on the cup 42 such that it surrounds the said cage 1. Multi-group rollers 2 are in rolling contact with the first conical raceway, so the first conical raceway is provided such that it faces towards the outer cone 41 of the cage 1. The second strut member 32 is a cone 41, a second conical raceway is formed on the cone 41 such that it surrounds the cage 1 from inside and faces towards the inner circular cone 41 of the cage 1. Multi-group rollers 2 are in rolling contact with the second conical raceway. Multi-group rollers 2 can roll on both first and second conical raceways in circumferential direction of the cage 1.

In present embodiment, the first strut member 31, second strut member 32 and the cage 1 can be in conical ring shape.

Based upon the improvement mentioned above, for each group of the pockets, the center points of the pockets are distributed along circumferential direction of the cage 1 in a sine curve track 43 to reduce wear and pitting on the raceway. An option is that, in one cycle around the cage 1, the center points of the pockets are distributed in a two-cycle sine curve track 43. For the bearing involved in nutational movement, the number of pockets included in a group is an even number, the pockets are arranged such that the center points of the pockets in a round of the cage 1 are distributed in a two-cycle sine curve track 43.

The sine curve 43 in this embodiment is an imaginary curve running circumferentially in the cage 1, which is stated herein just for the purpose of the illustration of the arrangement of the pockets 11. Each group of pockets has a corresponding imaginary sine curve 43.

Figure 10:
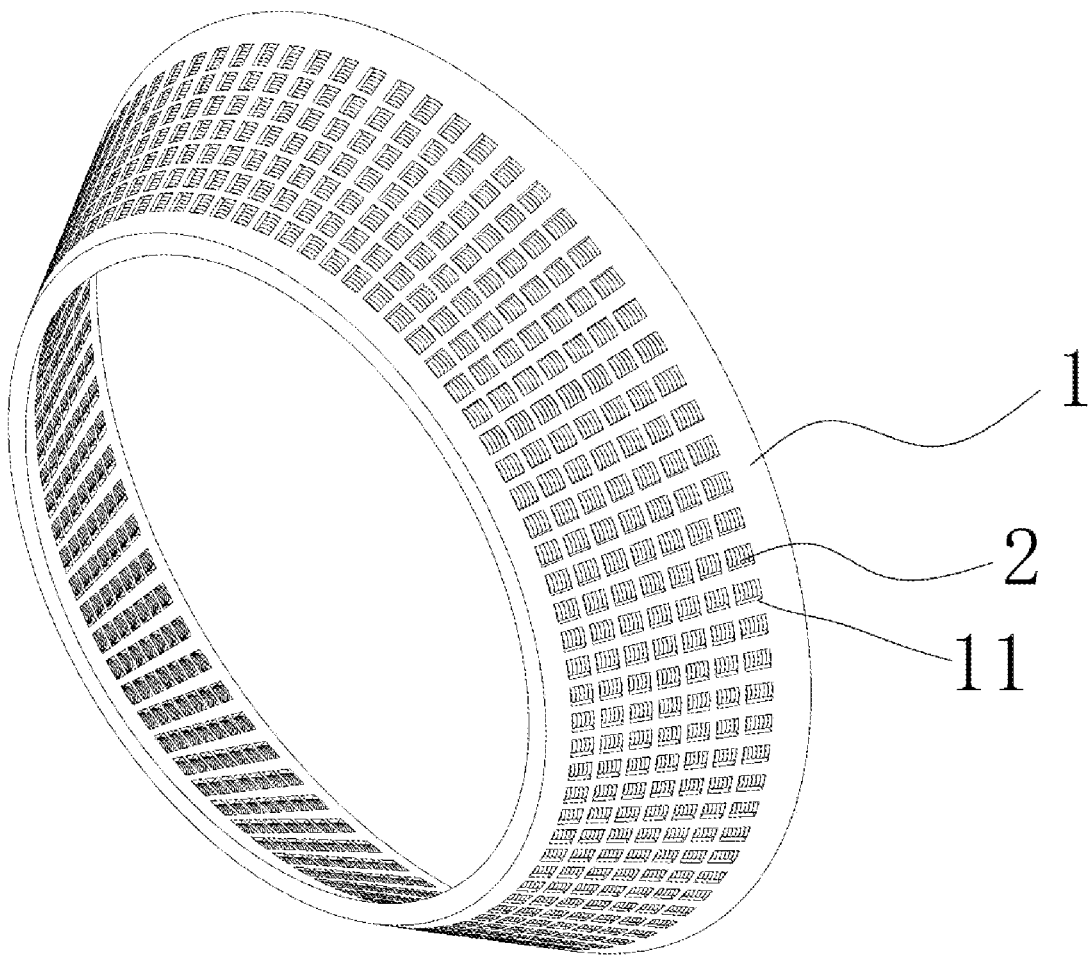
FIG. 10 exemplarily shows the schematic diagram of the first structure of the rollers provided in the pocket of the cage in embodiment 3 of present disclosure.
Figure 11:
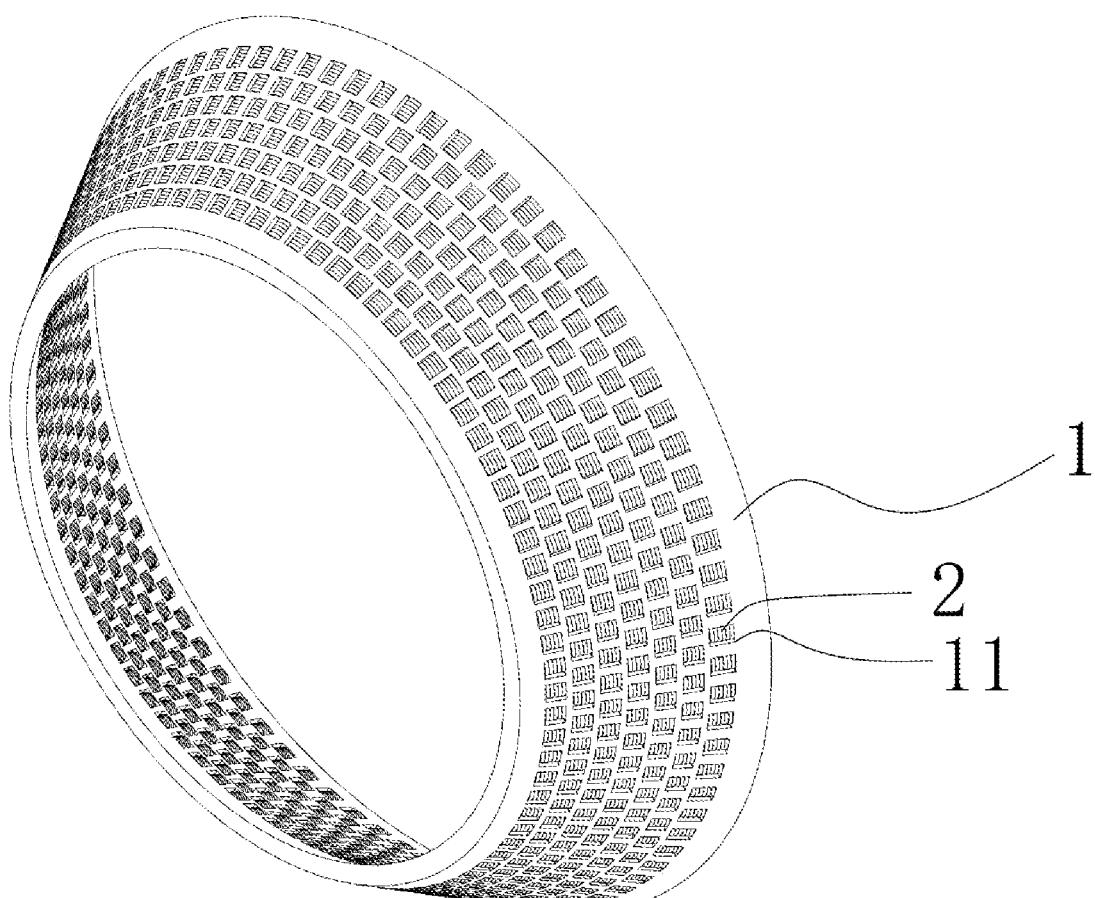
FIG. 11 exemplarily shows the schematic diagram of the second structure of the rollers provided in the pocket of the cage in embodiment 3 of present disclosure.
Figure 12A:
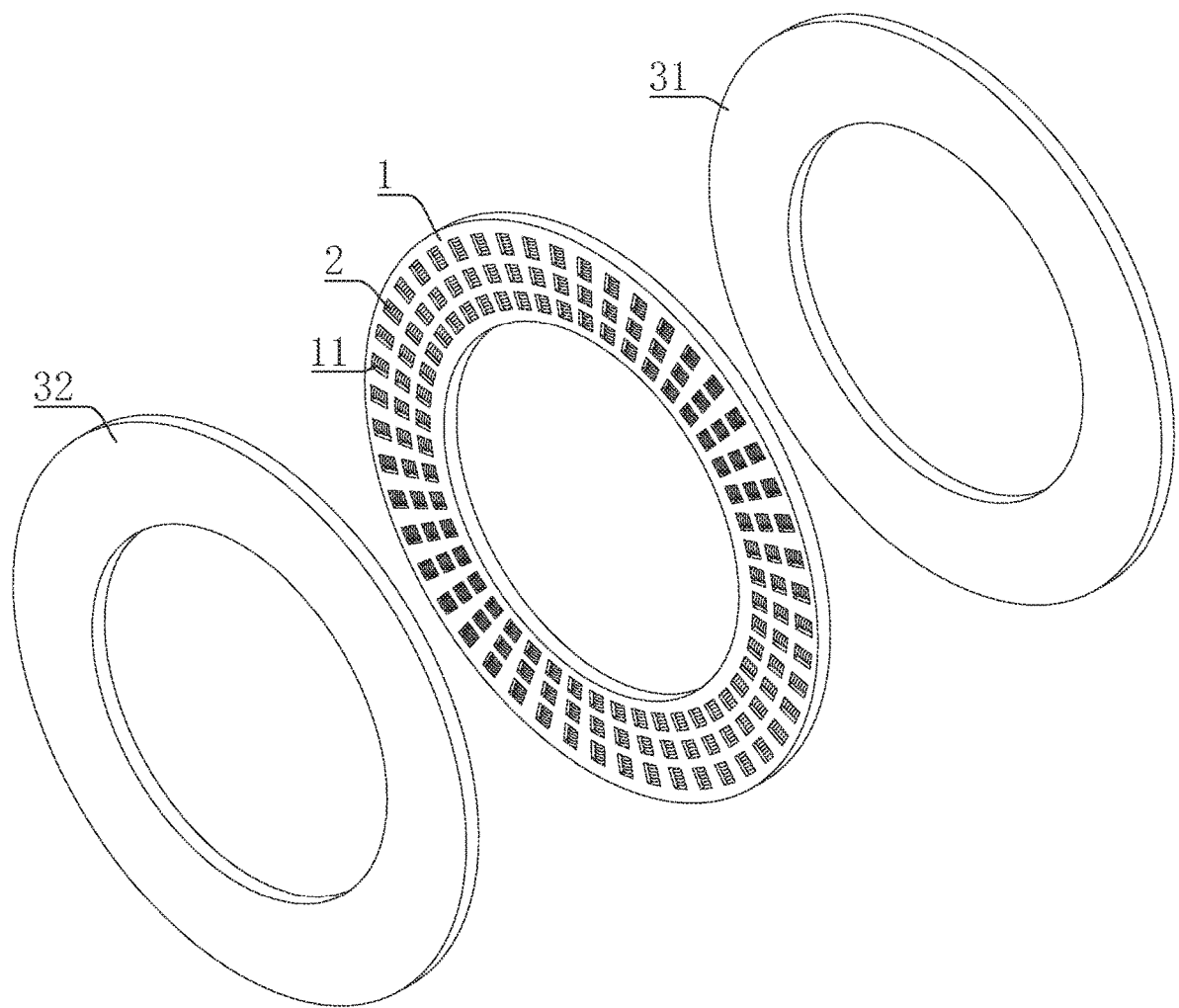
FIG. 12a exemplarily shows the schematic diagram of the first structure of of the planar thrust bearing in embodiment 2 of present disclosure.
Figure 12B:
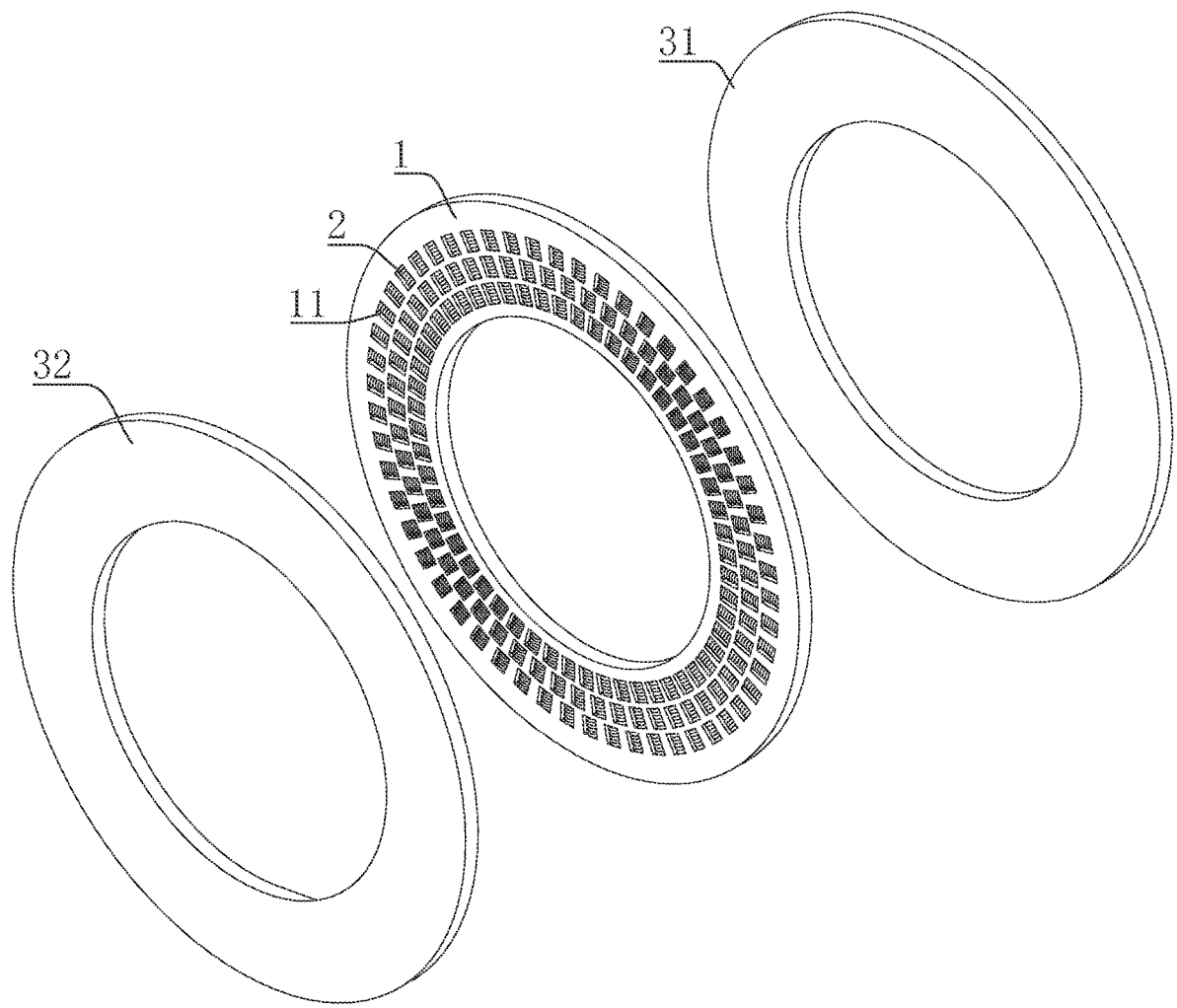
FIG. 12b exemplarily shows the schematic diagram of the second structure of the planar thrust bearing in embodiment 2 of present disclosure.
Figure 13A:
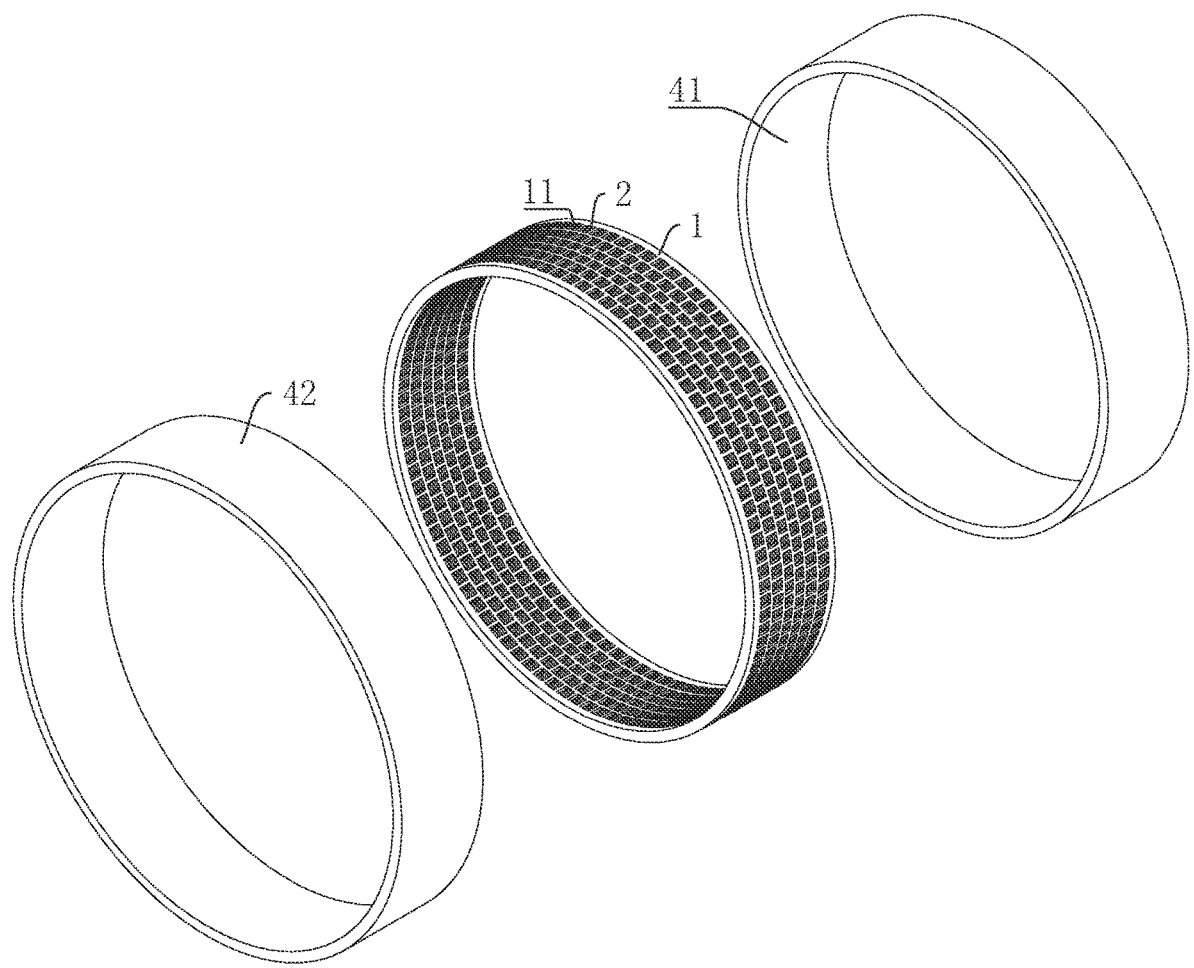
FIG. 13a exemplarily shows the schematic diagram of the first structure of the radial bearing in embodiment 3 of present disclosure.
Figure 13B:
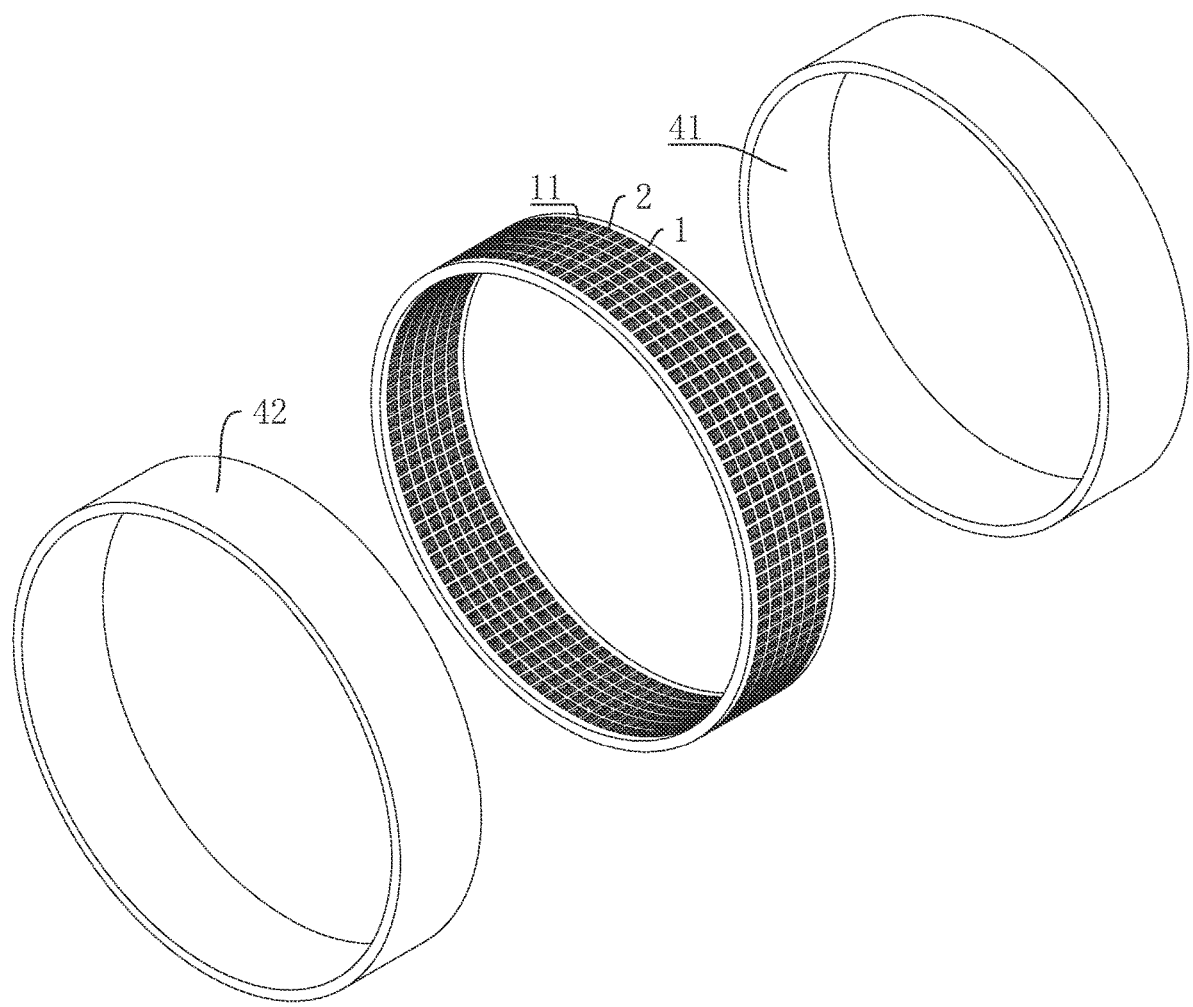
FIG. 13b exemplarily shows the schematic diagram of the second structure of the radial bearing in embodiment 3 of present disclosure.
Figure 13C:
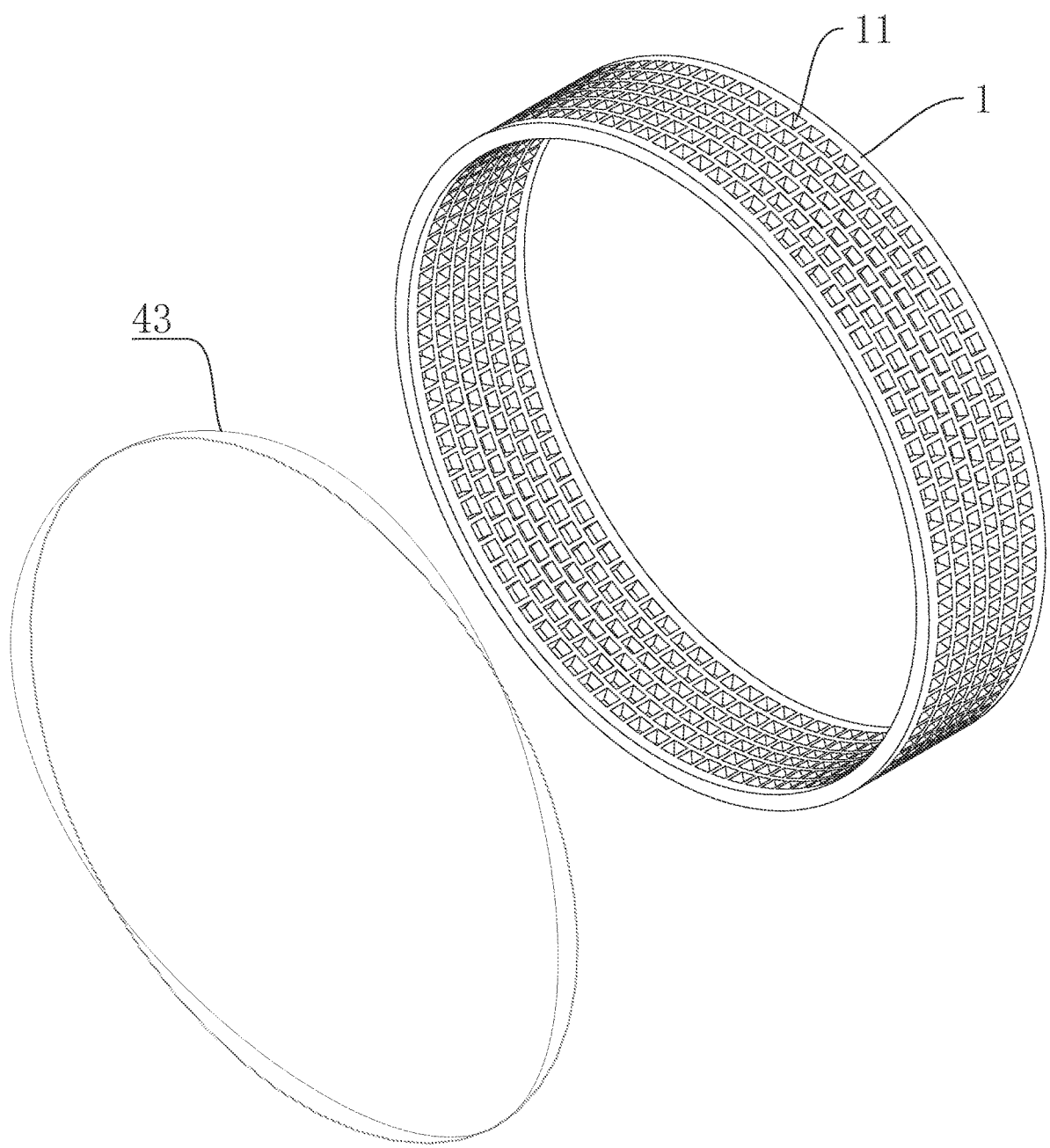
FIG. 13c exemplarily shows the schematic diagram of the sine curve in embodiment 3 of present disclosure.
Figure 14A:
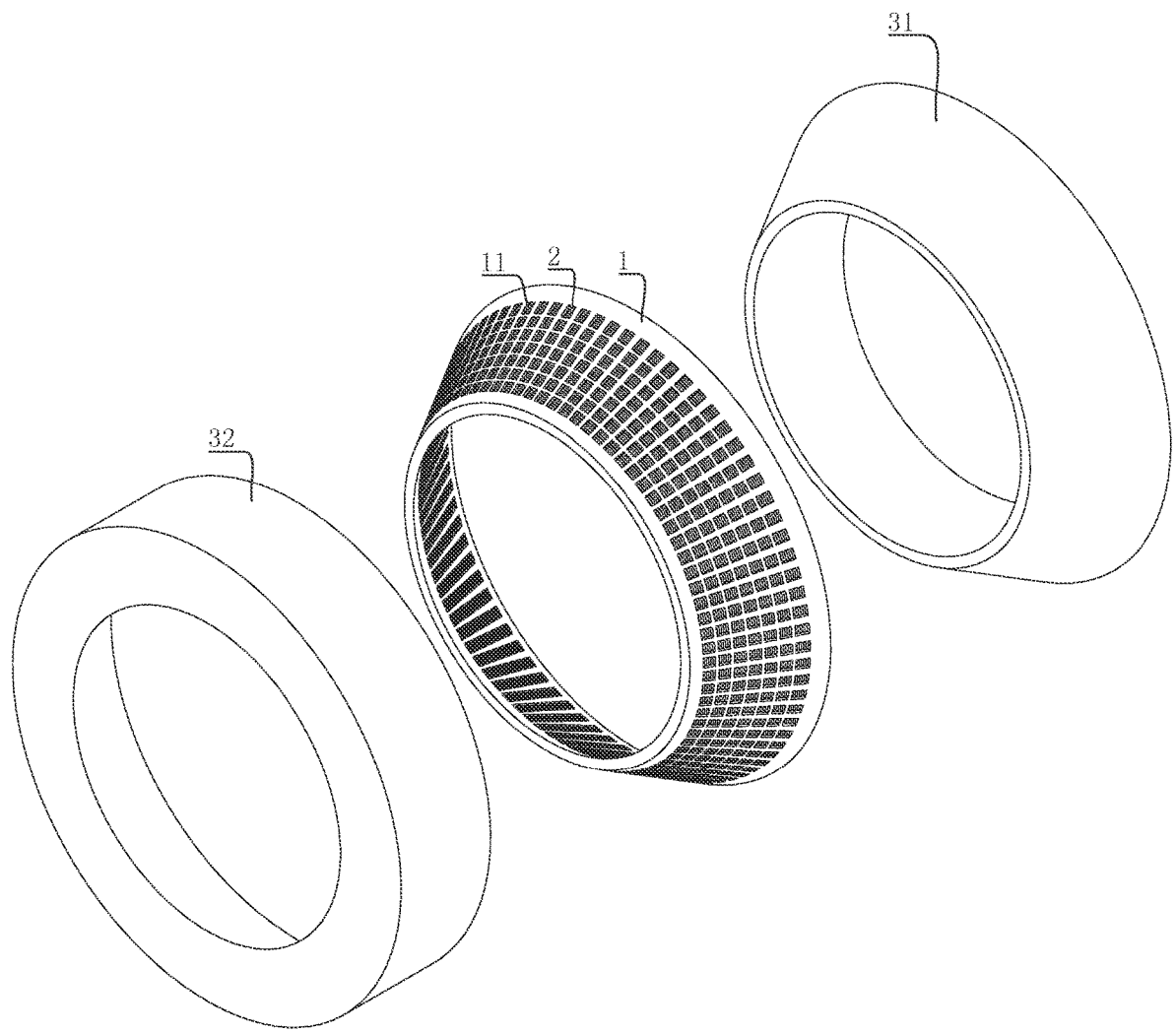
FIG. 14a exemplarily shows the schematic diagram of the first structure of the conical radial-thrust bearing in embodiment 4 of present disclosure.
Figure 14B:
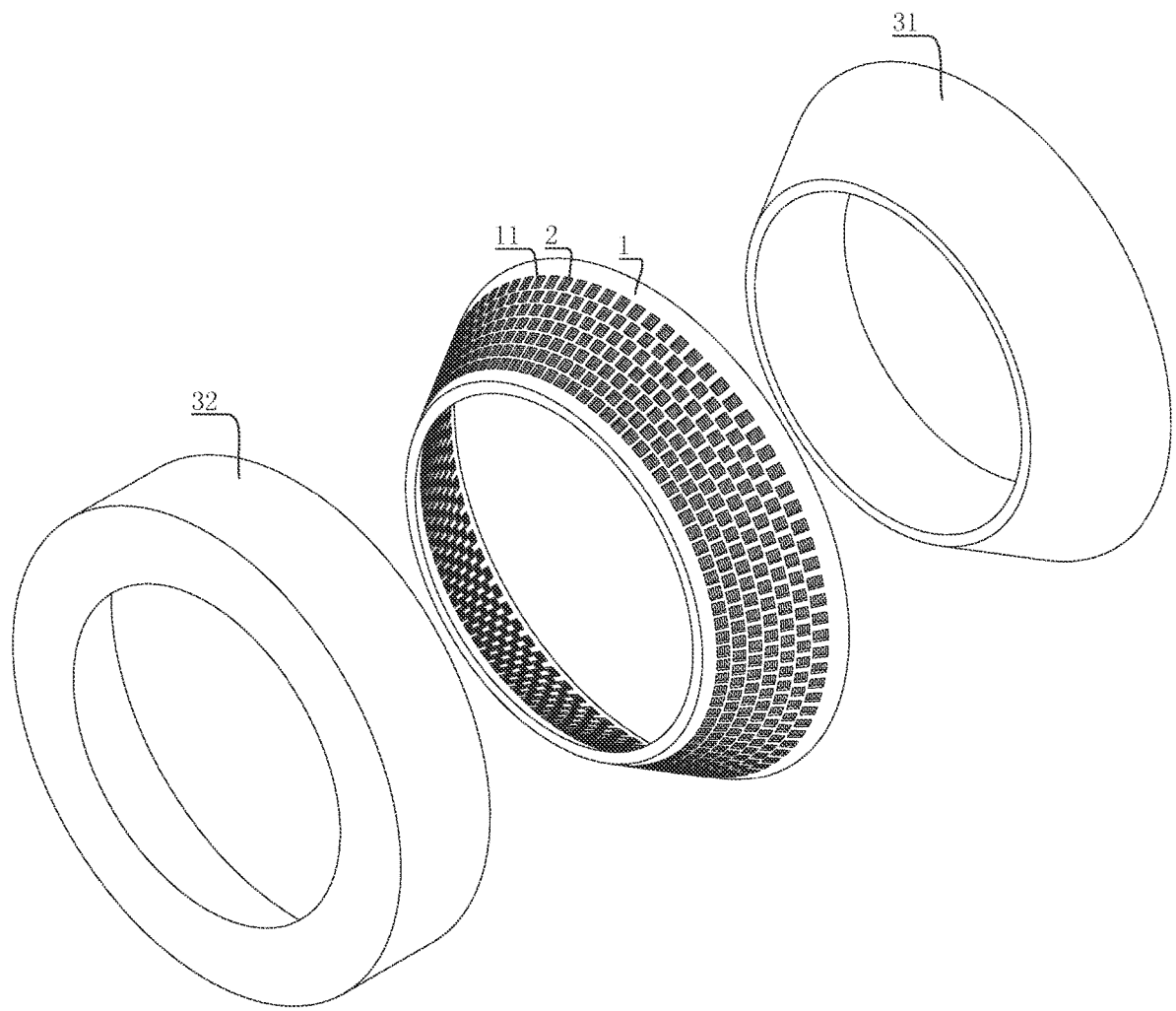
FIG. 14b exemplarily shows the schematic diagram of the second structure of the conical radial-thrust bearing in embodiment 4 of present disclosure.

An option is that, as illustrated in FIG. 10, if pockets in multiple groups are arranged in alignment along the generatrix of the cage 1 (i.e., linear alignment), for a pair of adjacent pockets in the same group, nearest to the wave crest of sine curve 43, the ratio between the distances of their center points to wave crest is constant among groups and can be set to be 1:3 or 3:1. The material of the cage 1 along both the diameter and weft lines is continuous, having a better rigidity, but the defect is that the contact points are also distributed in diameter line on the raceway. As a result, if the race track is not thick enough, its deformation will be larger. As illustrated in FIG. 11, the pockets 11 in adjacent groups are arranged in staggered form, multiple groups of pockets 11 from one end to the other end along the axis of cage 1 in turn are expressed as C1, C2 . . . Cn. For the odd groups, the ratio between the distances from the centers of a pair of adjacent pockets 11, that are nearest to the wave crest of sine curve 43, to wave crest is M, while for even groups, the ratio between the distances from the centers of a pair of adjacent pockets 11, that are nearest to the wave crest of sine curve 43, to wave crest is 1/M, where M can be 1:3 or 3:1. For this arrangement, in comparison with linear arrangement, the rigidity of the cage 1 is a little weaker since the cage 1 material along diameter line is zigzag, but the pockets 11 are in diamond pattern on the raceway, resulting in less elastic deformation of the raceway and thus suitability for the situation where the wall thickness of raceway is thinner. Above arrangements are the best choice of present embodiment, but it is not limited to above mentioned. Rather, it is possible to make a reasonable arrangement in accordance with specific requirement.

The foregoing specifically illustrates and describes exemplary embodiments of the present disclosure. It is to be understood that the present disclosure is not limited to the detailed structures, set-ups, or methods of implementation described herein; rather, the present disclosure is intended to cover a variety of modifications and equivalents that are within the spirit and scope of the appended claims.

The invention claimed is:

1. A cage assembly comprising:
   an annular cage, in which multi-group pockets are circumferentially distributed, wherein the circumferential distribution tracks for said multi-group pockets are located in different radial positions of the cage, or different positions of the generatrix of the annular cage respectively;
   multi-group rollers, each group of which comprises multiple stacked rollers, wherein each of said rollers is a barrel roller, the ratio of the thickness of each said roller to maximum diameter thereof is no more than one-third, the curvature radius of the generatrix of the rollers is no more than 10 times of maximum radius thereof; wherein in each pocket, a group of said rollers is disposed, wherein said rollers in said multi-group pockets are rollable in the cage in a circumferential direction thereof.

2. The cage assembly as claimed in claim 1, wherein the ratio of the thickness of each roller to maximum diameter thereof is no less than ⅛.

3. The cage assembly as claimed in claim 1, wherein in each group of rollers, the number of rollers is more than 1, and no more than 10.

4. The cage assembly as claimed in claim 1, wherein said pockets are rectangular.

5. The cage assembly as claimed in claim 4, wherein the length of said pocket extending along the axis of the rollers is W1, while the length of said pocket is W2, the maximum diameter of said rollers is provided to be Dmax, and the stacked gapless height of one group of said rollers in the pocket is H, the fit clearance between said rollers and said pocket is $\zeta$, where W1=H+n×$\zeta$, W2=Dmax+$\zeta$, 0.005 mm≤$\zeta$≤0.015 mm, where n denotes the number of rollers in the pocket.

6. A planar thrust bearing, comprising the cage assembly as claimed in claim 1.

7. The planar thrust bearing as claimed in claim 6, wherein said planar thrust bearing also comprises a first and second strut member; said cage is annular plate-shaped, said first strut member is arranged on one axial side of said cage and has a first planar raceway, which encircles an axis of the cage and with which the multi-group rollers are in rolling contact; the second strut member is arranged on the other axial side of said cage and has a second planar raceway, which encircles the axis of the cage and with which the multi-group rollers are in rolling contact; the multi-group rollers are rollable on both the first and second raceways in the circumferential direction of the cage.

8. The planar thrust bearing as claimed in claim 7, wherein on an end plane of the cage, perpendicular to the axis of the cage, the centers of the pockets in each pocket group are distributed in the circumferential direction of said cage along an elliptic track; the center of the elliptic track for each pocket group is concentric with the center of the cage, and the major axes of any two elliptic tracks, in each of which the pocket centers are distributed, are collinear with each other.

9. A radial bearing, comprising the cage assembly as claimed in claim 1, wherein said radial bearing also comprises a bearing cone and cup; said cage is tube-shaped, a first cylindrical raceway is formed on the bearing cone surrounds surrounded by said cage; said bearing cone is nested within said bearing cup, and said cage is disposed within the annular space between the bearing cone and bearing cup; a second cylindrical raceway is formed on the cup encircling the cage; the multi-group rollers are in rolling contact with the first and second raceways and rollable on both the first and second cylindrical raceways in the circumferential direction of the cage.

10. The radial bearing as claimed in claim 9, wherein the centers of the pockets in each group are distributed along circumferential direction of said cage in a sine curve trajectory.

11. A conical radial-thrust bearing, comprising said cage assembly as claimed in claim 1, wherein said conical radial-thrust bearing also comprises first and second strut members, said first strut member is a cup facing towards an outer circular cone of said cage and having a first conical raceway encircling said cage, and multi-group rollers are in rolling contact with said first conical raceway; said first conical raceway is oriented to face towards the outer circular cone of said cage; said second strut member has a second conical raceway surrounded by said cage and facing towards an inner circular cone of said cage, and the multi-group rollers are in rolling contact with said second conical raceway; the multi-group rollers are rollable on both the first and second conical raceways in the circumferential direction of the cage.

* * * * *